US011901678B2

(12) United States Patent
Hoyack et al.

(10) Patent No.: US 11,901,678 B2
(45) **Date of Patent: *Feb. 13, 2024**

(54) CONTACT MEMBER FOR ELECTRICAL CONNECTOR

(71) Applicant: Amphenol Corporation, Wallingford, CT (US)

(72) Inventors: Michael A Hoyack, Newtown, CT (US); Owen R. Barthelmes, Putnam Valley, NY (US); Kenneth Capozzi, Naugatuck, CT (US)

(73) Assignee: Amphenol Corporation, Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,318

(22) Filed: Jan. 23, 2023

(65) Prior Publication Data

US 2023/0223724 A1 Jul. 13, 2023

Related U.S. Application Data

(63) Continuation of application No. 17/170,202, filed on Feb. 8, 2021, now Pat. No. 11,563,295, which is a (Continued)

(51) Int. Cl.

| | |
|---|---|
| ***H01R 24/40*** | (2011.01) |
| ***H01R 4/2495*** | (2018.01) |
| ***H01R 9/05*** | (2006.01) |

(52) U.S. Cl.

CPC ........... *H01R 24/40* (2013.01); *H01R 4/2495* (2013.01); *H01R 9/0509* (2013.01)

(58) Field of Classification Search

CPC ..... H01R 24/40; H01R 4/2495; H01R 9/0509

See application file for complete search history.

(56) References Cited

U.S. PATENT DOCUMENTS 3,670,298 A 6/1972 Klumpp, Jr.
4,374,606 A 2/1983 Lathrop (Continued)

FOREIGN PATENT DOCUMENTS

CN 102709717 A 10/2012
CN 103490200 A 1/2014

(Continued)

OTHER PUBLICATIONS

European Search Report for European Application No. 23160389.5; dated May 23, 2023, 9 pages.

*Primary Examiner* — Abdullah A Riyami
*Assistant Examiner* — Nader J Alhawamdeh
(74) *Attorney, Agent, or Firm* — CANTOR COLBURN LLP

(57) ABSTRACT

A contact member includes, an outer conductor including a mating interface section that includes a front end of the outer conductor, a termination section including a rear end of the outer conductor, and a middle section therebetween joining the mating interface and termination sections; an inner conductor received in the mating interface section; and a protective insulator including a main portion received in the mating interface section of the outer conductor and supporting the inner conductor and including an end portion configured for closed entry mating. The end portion has an end face extending outside of the front end of the outer conductor.

15 Claims, 12 Drawing Sheets

Related U.S. Application Data continuation of application No. 16/712,110, filed on Dec. 12, 2019, now Pat. No. 10,992,087.

(60) Provisional application No. 62/779,030, filed on Dec. 13, 2018.

(56) References Cited

U.S. PATENT DOCUMENTS

| | | | | |
|---|---|---|---|---|
| 4,377,320 | A | 3/1983 | Lathrop et al. | |
| 4,412,717 | A | 11/1983 | Monroe | |
| 4,619,496 | A | 10/1986 | Forney, Jr. et al. | |
| 4,621,422 | A | 11/1986 | Neumann et al. | |
| 5,074,809 | A | 12/1991 | Rousseau | |
| 5,217,391 | A | 6/1993 | Fisher, Jr. | |
| 5,556,292 | A | 9/1996 | Kato et al. | |
| 6,439,925 | B1 | 8/2002 | Lin et al. | |
| 6,491,542 | B1 | 12/2002 | Zerebilov | |
| 6,679,726 | B1 * | 1/2004 | Tunn .................. | H01R 13/6315 439/550 |
| 7,326,063 | B1 * | 2/2008 | Raudenbush ........ | H01R 13/748 439/63 |
| 7,494,374 | B2 * | 2/2009 | Hall ....................... | H01R 24/52 439/97 |
| 8,043,117 | B2 | 10/2011 | Blakborn et al. | |
| 8,465,321 | B2 * | 6/2013 | Montena .............. | H01R 9/0524 439/579 |
| 9,423,548 | B2 | 8/2016 | Scholtz | |
| 9,660,355 | B2 * | 5/2017 | Kato .................. | H01R 13/6591 |
| 9,728,911 | B2 | 8/2017 | Vaccaro | |
| 9,735,521 | B2 | 8/2017 | Zhu et al. | |
| 9,735,531 | B2 | 8/2017 | Zhu et al. | |
| 9,929,519 | B1 | 3/2018 | Hall et al. | |
| 10,116,097 | B2 | 10/2018 | Nakashima | |
| 10,199,780 | B2 * | 2/2019 | Volkmann ................ | H01R 4/20 |
| 10,224,659 | B2 | 3/2019 | Pemwieser et al. | |
| 10,249,995 | B2 | 4/2019 | Zebhauser et al. | |
| 10,348,044 | B2 * | 7/2019 | Surer ....................... | H01R 4/64 |
| 10,797,412 | B2 * | 10/2020 | Barthelmes .......... | H01R 9/0527 |
| 2003/0224656 | A1 * | 12/2003 | Yoshida ............... | H01R 9/0518 439/578 |
| 2005/0118866 | A1 | 6/2005 | Abe et al. | |
| 2012/0135625 | A1 | 5/2012 | Yokoyama et al. | |
| 2013/0023155 | A1 | 1/2013 | Il | |
| 2015/0255886 | A1 | 9/2015 | Schmidt et al. | |
| 2018/0138632 | A1 | 5/2018 | Qin et al. | |
| 2018/0183190 | A1 * | 6/2018 | Volkmann ............ | H01R 9/0518 |
| 2018/0248317 | A1 | 8/2018 | Van Swearingen et al. | |
| 2021/0167562 | A1 | 6/2021 | Hoyack et al. | |

FOREIGN PATENT DOCUMENTS

| | | | |
|---|---|---|---|
| DE | 3412874 | C1 | 8/1985 |
| DE | 19913898 | C1 | 1/2001 |
| DE | 10315042 | A1 | 10/2003 |
| DE | 102005026030 | A1 | 1/2006 |
| EP | 0981180 | A1 | 2/2000 |
| EP | 1174948 | A1 | 1/2002 |
| EP | 3227970 | A1 | 10/2017 |
| EP | 3340388 | A1 | 6/2018 |
| EP | 3227971 | B1 | 9/2019 |
| FR | 1279360 | A | 12/1961 |
| JP | 2002208461 | A | 7/2002 |
| JP | 2006080030 | A | 3/2006 |
| WO | 2017144069 | A1 | 8/2017 |
| WO | 2017144070 | A1 | 8/2017 |
| WO | 2017144071 | A1 | 8/2017 |
| WO | 2017144072 | A1 | 8/2017 |
| WO | 2017144121 | A1 | 8/2017 |

* cited by examiner

CONTACT MEMBER FOR ELECTRICAL CONNECTOR

CROSS-REFERENCE TO RELATED APPLICATIONS

This application is a continuation application of U.S. application Ser. No. 17/170,202 filed on Feb. 8, 2021 and entitled "Contact Member for Electrical Connector," which is a continuation application of U.S. application Ser. No. 16/712,110 filed on Dec. 12, 2019 and entitled "Contact Member for Electrical Connector," which claims the benefit of priority of U.S. Provisional Application Ser. No. 62/779,030 filed on Dec. 13, 2018 and entitled "Contact Member for Electrical Connector," the contents of which are relied upon and incorporated herein by reference in its entirety.

BACKGROUND

The disclosure relates to a contact member for an electrical connector and more particularly to a contact member being configured for both high density and high frequency capabilities for the connector.

Next generation radio frequency (RF) interconnect systems require increased channels and higher data bandwidth, which in turn require smaller, higher density and higher frequency RF connectors. Automobiles, for example, have an increasing need for RF interconnect to support new technologies, such as autonomous driving, 5G wireless networks, and V2X communications. The current automobile industry interface standard "FAKRA" is limiting based on size and frequency range. Also, this standard does not include a multi-channel version for higher density packaging.

SUMMARY

An aspect of this disclosure is a contact member for an electrical connector. The contact member includes an outer conductor including a mating interface section including a front end of the outer conductor, a termination section including a rear end of the outer conductor, and a middle section therebetween joining the mating interface and termination sections; an inner conductor received in the mating interface section; and a protective insulator including a main portion received in the mating interface section of the outer conductor and supporting the inner conductor and including an end portion configured for closed entry mating. The end portion has an end face extending outside of the front end of the outer conductor.

In certain examples, the front end of the outer conductor includes a plurality of spring fingers extending over at least part of the end portion of the protective insulator.

In some examples, the end portion of the protective insulator includes longitudinal spokes each extending between the spring fingers.

In other examples, the end face of the end portion of the protective insulator is an outer ring from which the spokes extend.

In another example, distal ends of the spring fingers rest behind a rear wall of the outer ring for the closed entry mating.

In certain examples, one or more openings are provided behind the rear wall of the outer ring allowing for free movement of the distal ends of the spring fingers.

In some examples, the outer conductor is formed as one-piece.

In other examples, a sleeve is disposed around the middle section of the outer conductor.

In another example, the middle section includes at least one window that is covered by the sleeve.

In certain examples, the termination section is deformable.

In some examples, the termination section includes one or more extensions shaped to fit together when the termination section is deformed.

Another aspect of this disclosure is an electrical connector. The electrical connector includes one or more contact members. Each contact member includes an outer conductor including a mating interface section including a front end of the outer conductor, a termination section including a rear end of the outer conductor, and a middle section therebetween joining the mating interface and termination sections; an inner conductor received in the mating interface section; and a protective insulator including a main portion received in the mating interface section and supporting the inner conductor and an end portion configured for closed entry mating. The end portion has an end face extending outside of the front end of the outer conductor.

In certain examples, the front end of the outer conductor includes a plurality of spring fingers extending over at least part of the end portion of the protective insulator.

In some examples, the end portion of the protective insulator includes longitudinal spokes each extending between the spring fingers.

In other examples, the end face of the end portion of the protective insulator is an outer ring.

In another example, one or more openings are provided behind a rear wall of the outer ring allowing for free movement of distal ends of the spring fingers.

In certain examples, the outer conductor is formed as one-piece.

In some examples, a sleeve is disposed around the middle section of the outer conductor and the middle section has an outer diameter that is smaller than an outer diameter of the termination section.

In other examples, the middle section includes at least one window that is covered by the sleeve.

Yet another aspect of this disclosure is an electrical connector. The electrical connector includes one or more contact members. Each contact member includes an outer conductor including a mating interface section including a front end of the outer conductor, a termination section including a rear end of the outer conductor, and a middle section therebetween joining the mating interface and termination sections, where the middle section has at least one slot; an inner conductor received in the mating interface section; a protective insulator including a main portion received in the mating interface section and supporting the inner conductor and an end portion configured for closed entry mating, where the main portion has at least one outer notch or annular groove; and a sleeve disposed around the middle section of the outer conductor. The sleeve has at least one inwardly extending tab received in the at least one slot of the middle section of the outer conductor and the at least outer notch or annular groove of the protective insulator.

In certain examples, the sleeve has an end shoulder configured to abut an inner portion of a housing of the electrical connector, thereby retaining the respective contact member in the housing.

In some examples, the middle section has an outer diameter that is less than an outer diameter of the termination section and the sleeve is disposed around the outer diameter of the middle section.

In other examples, the end portion of the protective insulator has an end face extending outside of the front end of the outer conductor.

In another example, the front end of the outer conductor includes a plurality of spring fingers extending over at least part of the end portion of the protective insulator and between spokes of the end portion.

This summary is not intended to identify all essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1A:
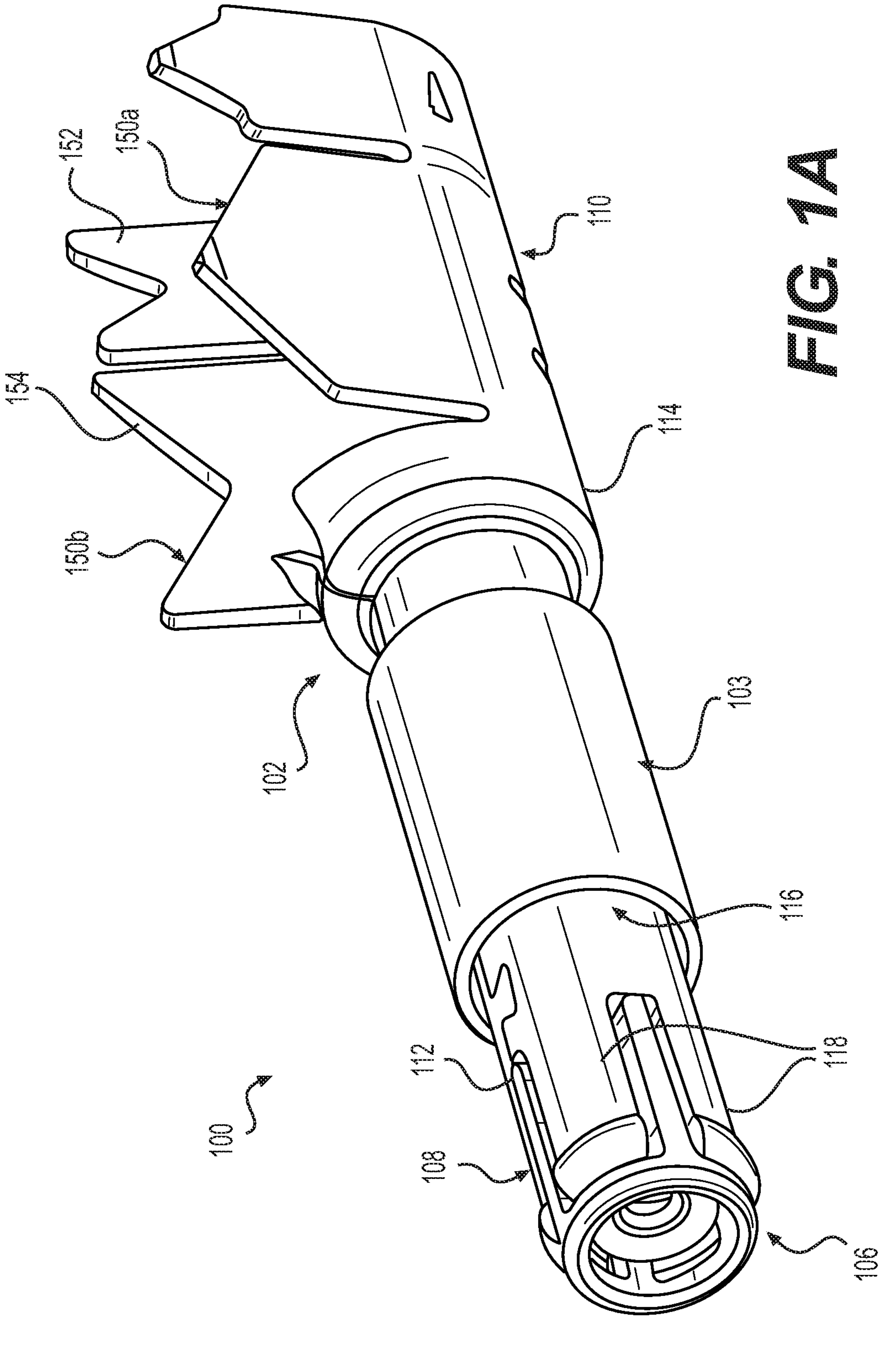
FIG. 1A is a perspective view of a contact member according to one example.
Figure 1B:
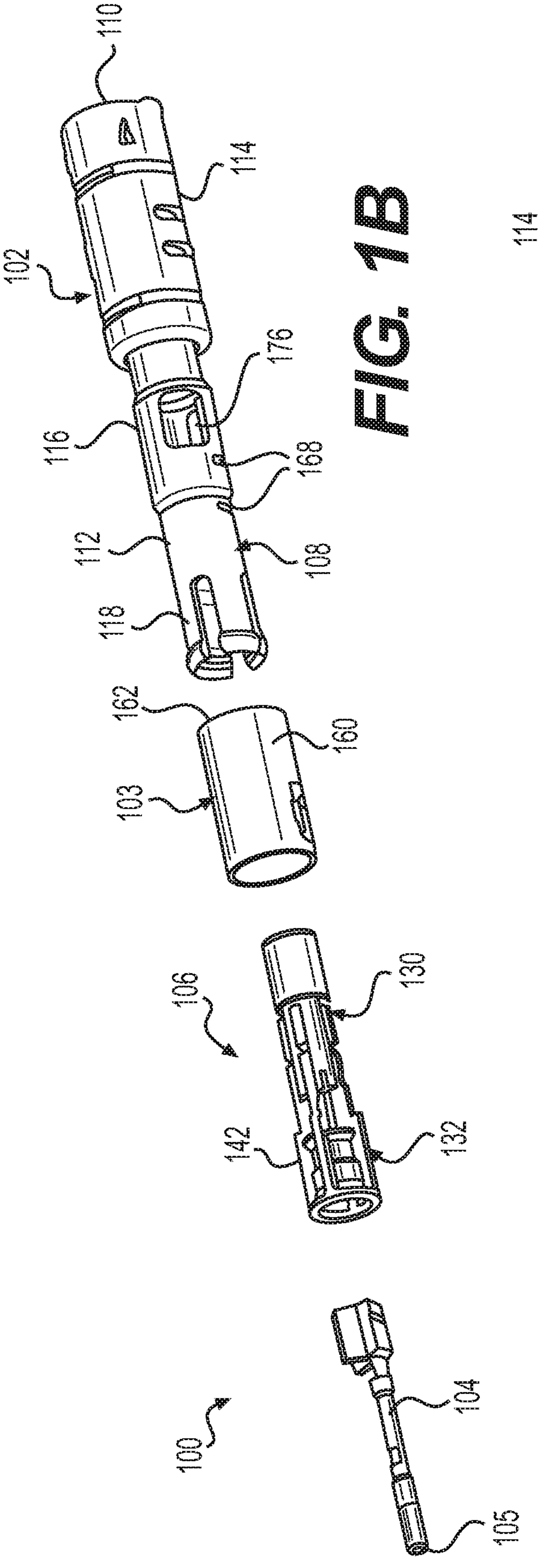
FIG. 1B is an exploded perspective view of the contact member illustrated in FIG. 1A.
Figure 1C:
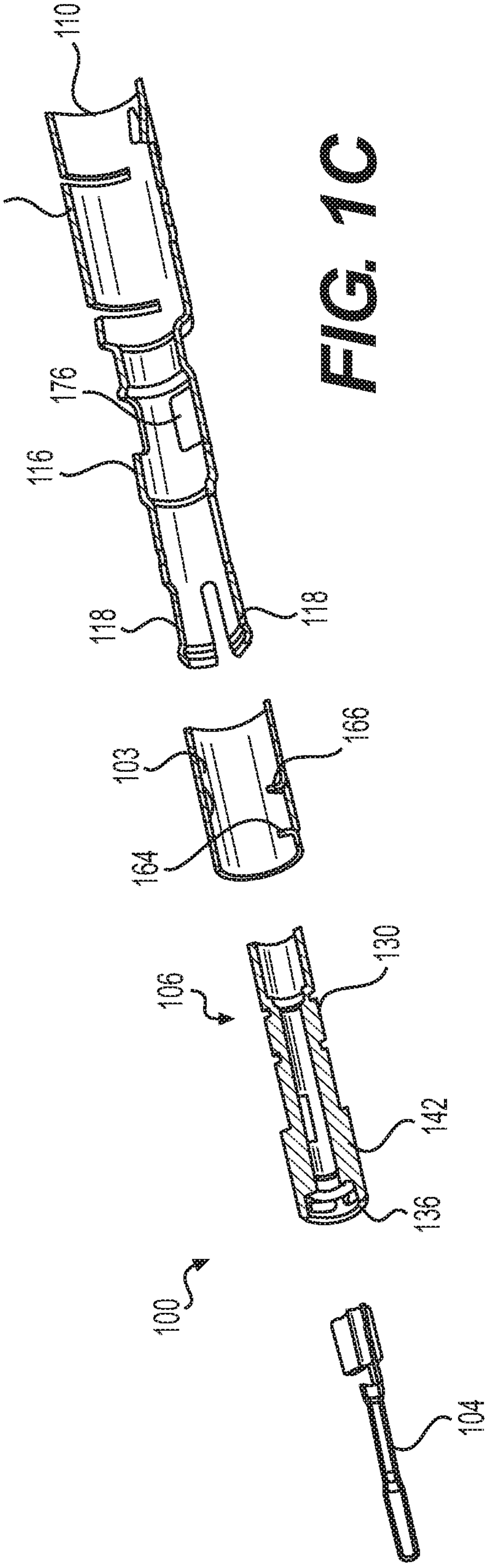
FIG. 1C is an exploded cross-sectional view of the contact member illustrated in FIG. 1B.
Figure 1D:
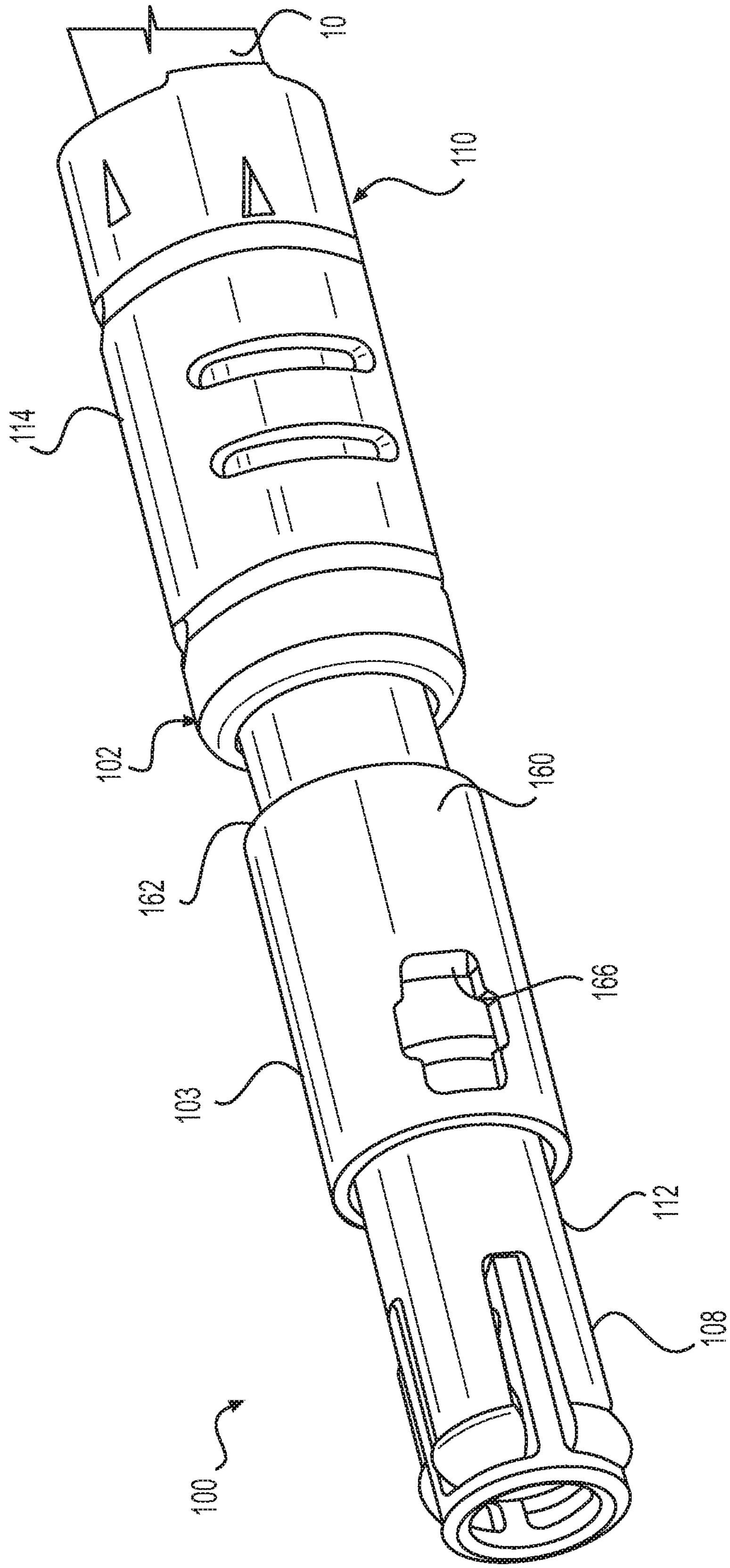
FIG. 1D is a perspective view of the contact member illustrated in FIG. 1A, showing a cable terminated to the contact member.
Figure 1E:
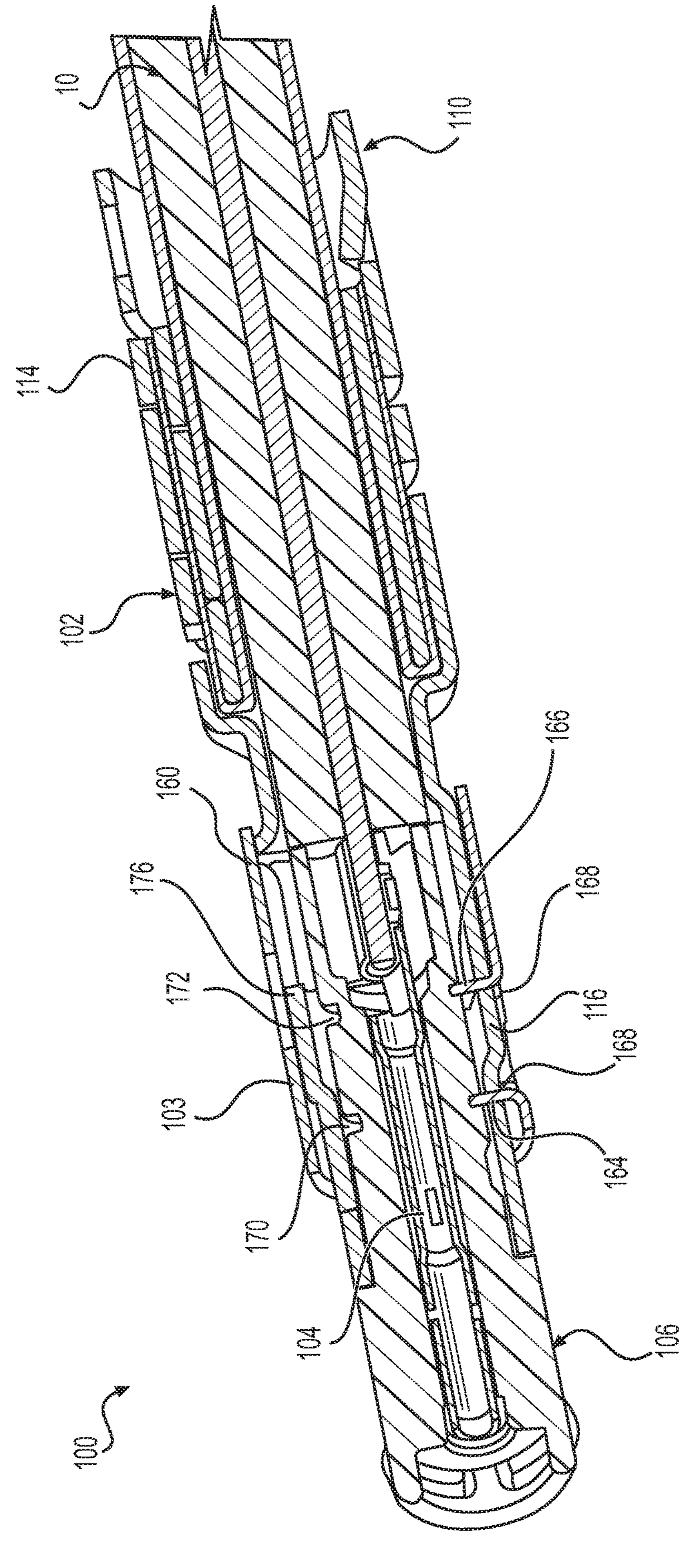
FIG. 1E is a cross-sectional view of the contact member illustrated in FIG. 1D.

FIG. 1A is a perspective view of a contact member 100 according to one example; FIG. 1B is an exploded perspective view of the contact member illustrated in FIG. 1A; FIG. 1C is an exploded cross-sectional view of the contact member illustrated in FIG. 1B; FIG. 1D is a perspective view of the contact member illustrated in FIG. 1A, showing a cable terminated to the contact member; and FIG. 1E is a cross-sectional view of the contact member illustrated in FIG. 1D. Referring to FIGS. 1A to 1E, the present disclosure provides a contact member 100 that may be used in electrical connectors, such as RF connectors, that may be used in automobiles, for example. The design of contact member 100 is compact for a higher density connector 200 (see, e.g., FIG. 5B) and also provides electrical loss and mechanical protection to the conductors/contacts of the connector 200, thereby providing the connector 200 with improved performance and higher frequency capability. Contact member 100 incorporates a robust closed entry mating; a low mating force contact configuration for improved ergonomics; and/or a geometry configuration that provides good impedance matching for high frequency operation with the standard mating interface.

Contact member 100 generally includes an outer conductor 102, an inner conductor 104 received in outer conductor 102, and a protective insulator 106 that is at least partially received in outer conductor 102 and supports the inner conductor 104, as seen in FIGS. 1A-1E. A sleeve 103 may also be provided that wraps around the outer conductor 102. The sleeve 103 may be formed of a conductive material.

Outer conductor 102 may include a front end 108 for engaging a mating connector 300 (FIG. 5A) and a rear end 110 for electrically connecting to cable 10 (FIGS. 1D and 1E), wires, and the like. Outer conductor 102 may comprise a mating interface section 112 that includes the front end 108 of the outer conductor 102, a termination section 114 that includes the rear end 110 of the outer conductor 102, and a middle section 116 therebetween joining the mating interface and termination sections 112 and 114, as seen in FIG. 1. The mating interface section 112 is designed to mate with a corresponding interface of a contact 302 of the mating connector 300 and the termination section 114 is designed to terminate and fasten to a prepared end of the cable 10, such as by crimping. The sleeve 103 may be disposed on the middle section 116. In an example, the outer conductor 102 is formed as one-piece.

Figure 2A:
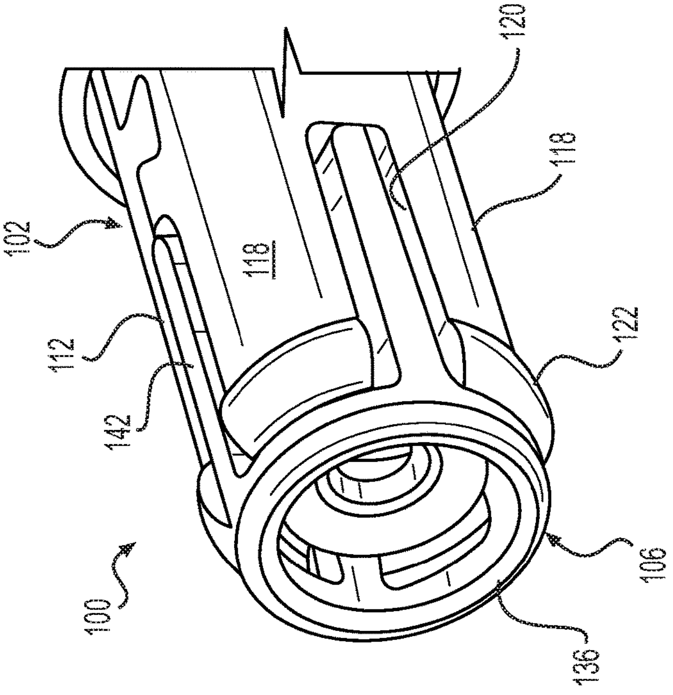
FIG. 2A is an enlarged partial end perspective view of the contact member illustrated in FIG. 1A.
Figure 3A:
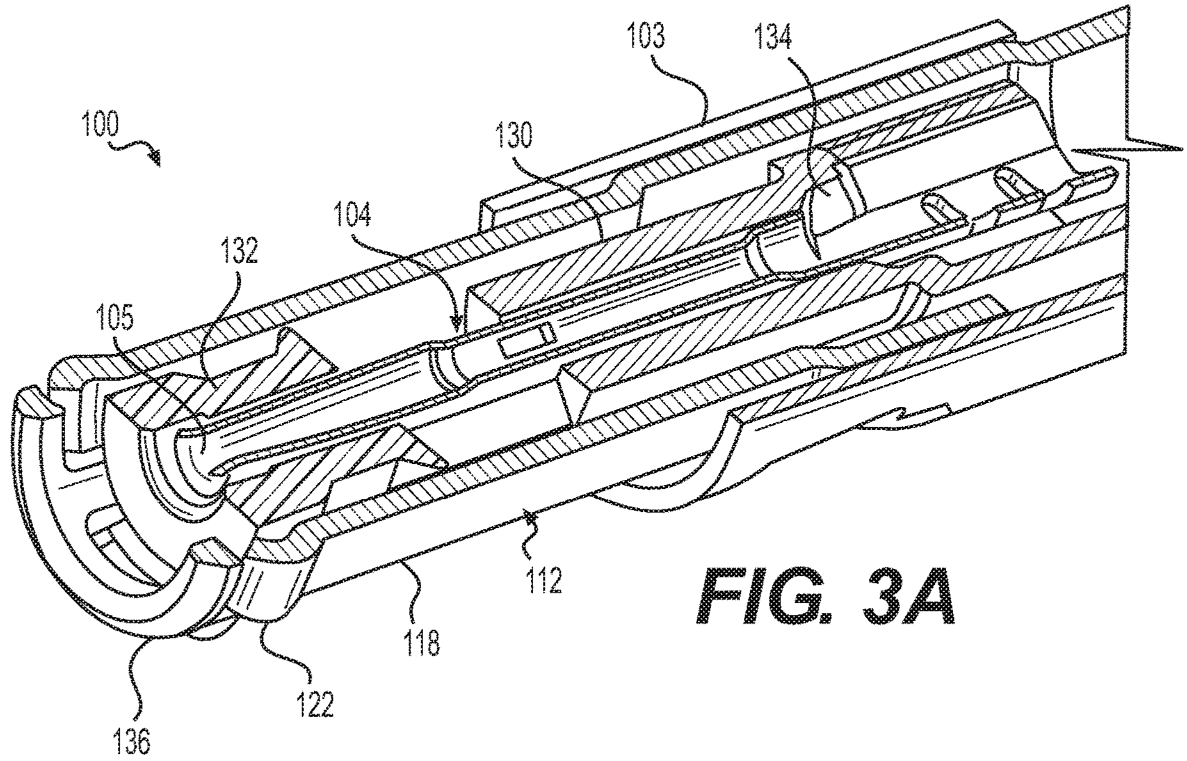
FIG. 3A is a partial cross-sectional perspective view of the contact member illustrated in FIG. 1A.
Figure 3B:
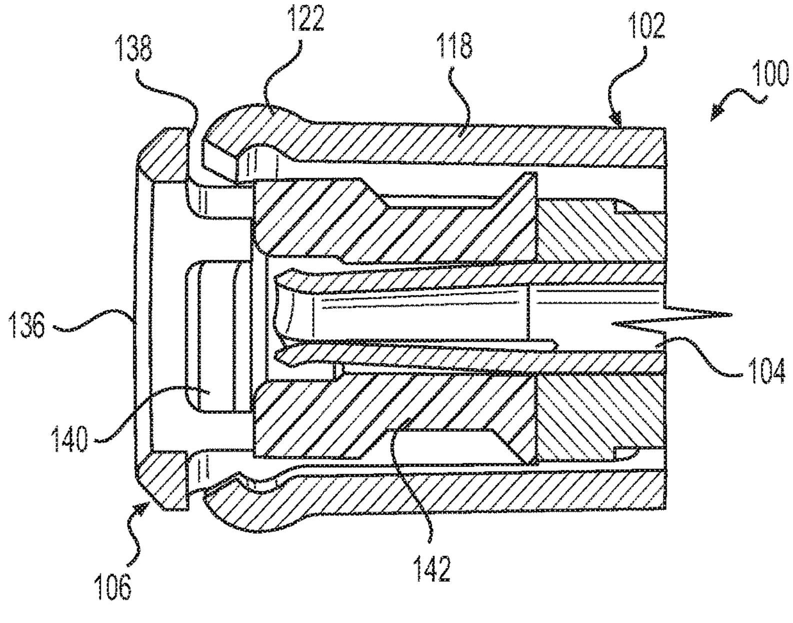
FIG. 3B is a partial cross-sectional elevational view of the contact member illustrated in FIG. 3A.

At the front end 108 of outer conductor 102 there may be one or more grounding spring fingers or tines 118 that define slots 120 therebetween. The distal end 122 of each spring finger 118 can be designed for electrical contact and connection with the mating connector 300. Each distal end 122 of the spring fingers 118 may have a generally convex shape that projects outwardly, as best seen in FIGS. 2A and 3B, to facilitate the electrical contact with the mating connector 300.

Figure 4A:
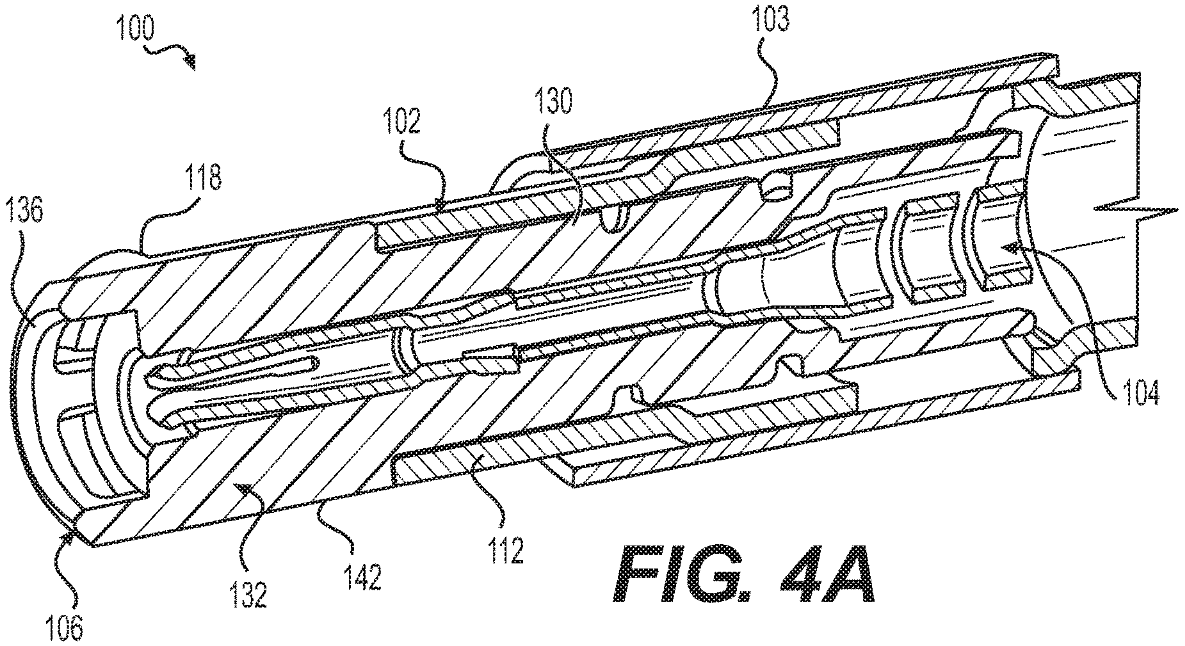
FIG. 4A is another partial cross-sectional perspective view of the contact member illustrated in FIG. 1A.
Figure 4B:
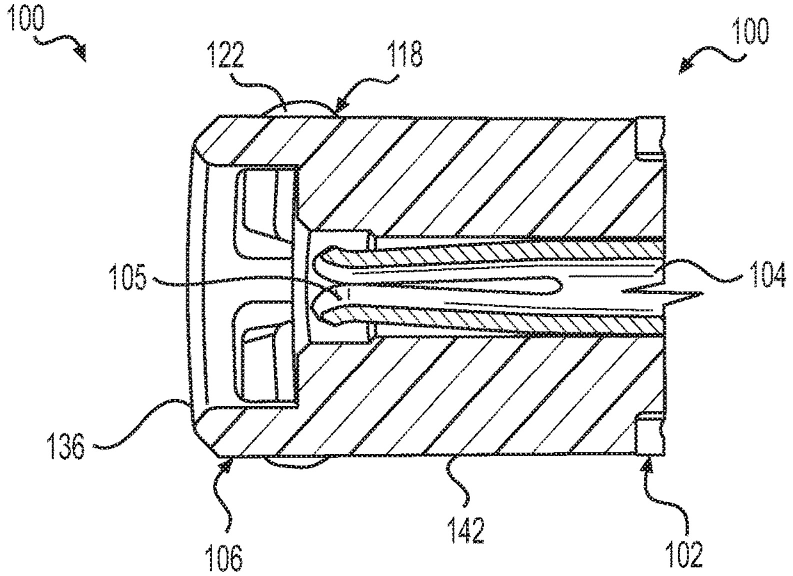
FIG. 4B is a partial cross-sectional elevational view of the contact member illustrated in FIG. 4A.

Protective insulator 106 may comprise a main portion 130 and an end portion 132, as seen in FIGS. 1B and 1C. Main portion 130 is configured to support the inner conductor 104 and may be elongated, as seen in FIGS. 3A and 4A. End portion 132 is configured for closed entry mating to protect both the mating end 105 (FIG. 2C) of the inner contact 104, which may be a socket, for example, and the spring fingers 118 of the outer conductor 102, when mating contact member 100 with corresponding contact member 302 of the mating connector 300. Main portion 130 has an inner bore 134 sized and shaped to accommodate inner conductor 104 and to fit within the body of the outer conductor 102.

End portion 132 of insulator 106 may have an end face 136 that extends outside of the front end 108 of the outer conductor 102 past the spring fingers 118, as seen in FIG.

Figure 2B:
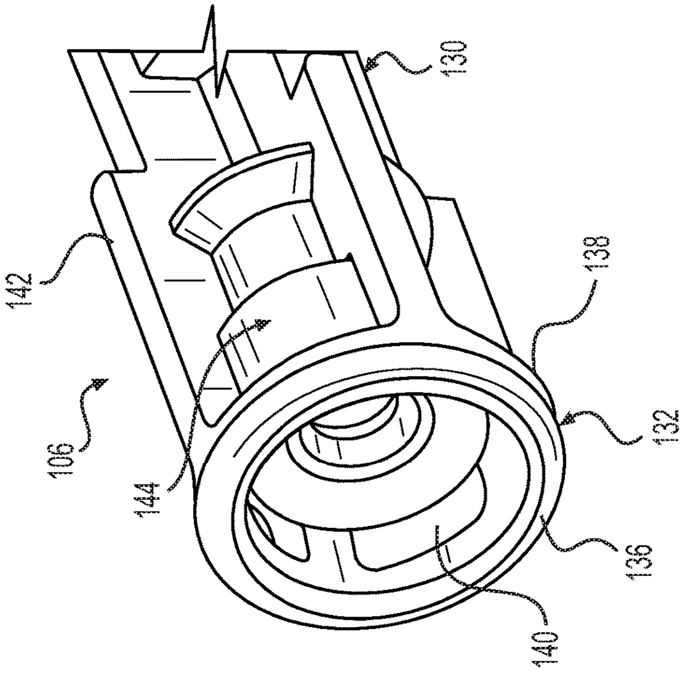
FIG. 2B is an enlarged perspective view of a protective insulator of the contact member illustrated in FIGS. 1A and 2A.
Figure 2C:
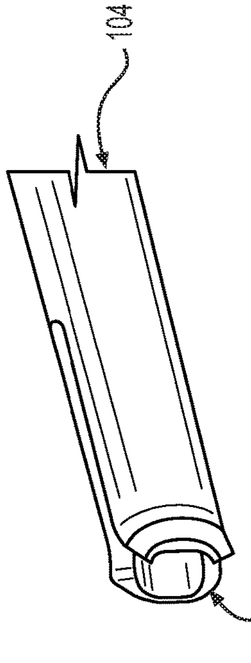
FIG. 2C is an enlarged partial perspective end view of an inner conductor of the contact member illustrated in FIG. 1A.

2A. In an example, the end face 136 forms a protective outer ring, as seen in FIG. 2B. A rear wall 138 of the end face 136 provides a barrier for the distal ends 122 of springs fingers 118, as best seen in FIG. 3B, thereby protecting the distal ends 122 from being damaged, stubbed or bent during mating of the connectors 200 and 300. End portion 132 may include one or more openings 140 behind the rear wall 138. Openings 140 may be located and configured to give the distal ends 122 of the spring fingers 118 free movement without interference from the insulator's end portion 132, as best seen in FIGS. 2B and 3B. Openings 140 can be arranged on end portion 132 to correspond to the location of the distal ends 122 of the fingers 118.

Longitudinal spokes 142 may also be provided on the end portion 132 of insulator 106 which extend back from the end face's rear wall 138. Spokes 142 are designed to provide structural support to strengthen the outer ring 136 and further protect fingers 118. In an example, each spoke 142 may be received in one of the slots 120 between spring fingers 118, as seen in FIG. 2A. Spokes 142 may be positioned around the end portion 132 such that the spaces 144 between spokes 142 are sized to receive one of the fingers 118, as seen in FIGS. 2A and 2B. In an example, the spokes 142 are uniformly spaced on end portion 132.

The termination section 114 of outer conductor 102 may be deformable for terminating to cable 10, wire, or the like. In an example, termination section 114 may be crimped to the cable 10, wire, or the like. Rear end 110 of outer conductor 102 is initially open for receiving the cable 10 such that one more extensions 150*a* and 150*b* of termination section 114 extend outwardly, as best seen in FIG. 1A. Extensions 150*a* and 150*b* are located opposite one another on section 114 and are configured to fit together when termination section 114 is deformed, such as by crimping. For example, one extension 150*a* may have a tail 152 that fits into a corresponding cut-out 154 of another extension 150*b*. As such, when termination section 114 is crimped, the extensions 150*a* and 150*b* fit together to close or nearly close the rear end 110.

Sleeve 103 may comprise a generally cylindrical shaped body 160, as seen in FIG. 1B, that fits over the middle section 116 of outer conductor 102, to provide added strength to contact member 100 and improved mechanical performance. The sleeve's body 160 may have one or more end shoulders 162 configured to assist with retaining contact member 100 within the housing of connector 200. Sleeve 103 may have one or more engagement features, such as tabs 164 and 166, for engaging outer conductor 102 and insulator 106. As seen in FIGS. 1C and 1E, the tabs 164 and 166 may extend inwardly from the sleeve's body 160. The tabs 164 and 166 can be positioned and spaced on the sleeve's body 160 to engage corresponding engagement features disposed in the middle section 116 of outer conductor 102 and in the main portion 130 of insulator 106. For example, the engagement features of the outer conductor's middle section 116 may be one or more slots 168 (FIG. 1B) and the engagement features of the insulator's main portion 130 may be one or more outer notches or annular grooves 170 and 172 (FIG. 1E). When contact member 100 is assembled, as seen in FIG. 1D, tabs 164 and 166 extend through slots 168 of the middle section 116 of outer conductor 120 and into outer notches or annular grooves 170 and 172, respectively, of the main portion of insulator 106, as seen in FIG. 1E. Other known engagement features may also to be used to engage the sleeve 103 with the middle section 116 of the outer conductor 102 and the main portion 130 of the insulator 106.

In an example, the middle section 116 of outer conductor 102 has an outer diameter that is smaller than the outer diameter of the termination section 114, thereby making contact member 100 more compact in size. Sleeve 103 may be disposed around the smaller outer diameter of the middle section 116. One or more windows 176 may be provided in the middle section 116 of outer conductor 102, as seen in FIGS. 1B and 1C. Windows 176 are positioned and configured to improve electrical performance by adding air inside outer conductor 102 and around insulator 106 and inner conductor 104 for impedance matching, as seen in FIG. 1E. Sleeve 103 can be positioned to cover the windows 176 to prevent signal leakage therethrough.

Figure 5A:
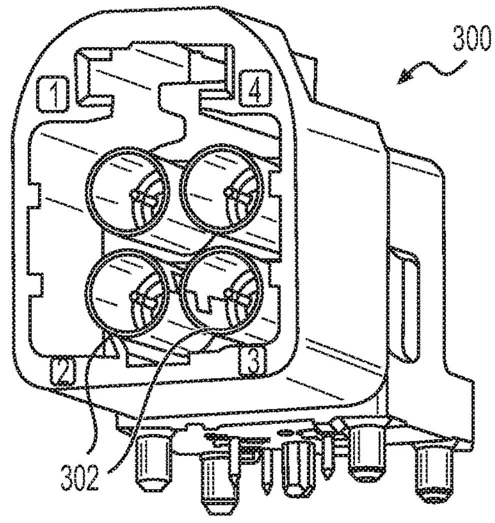
FIGS. 5A-5C are various perspective views of RF connectors components and the assembly of the same according to an example.
Figure 5B:
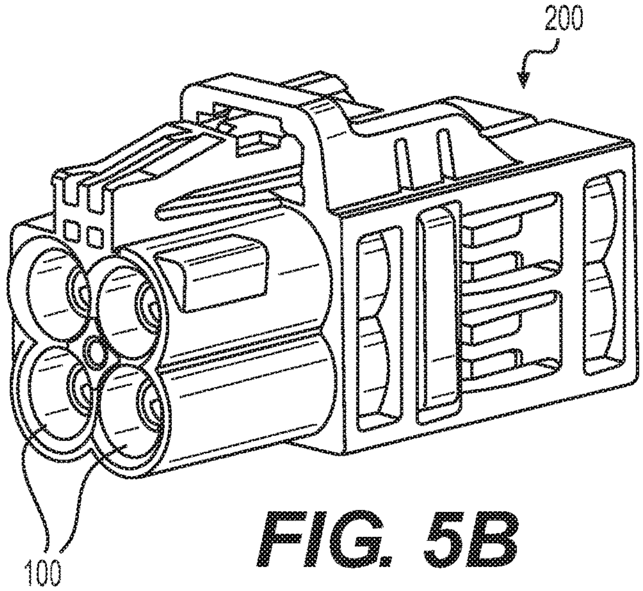
Figure 5C:
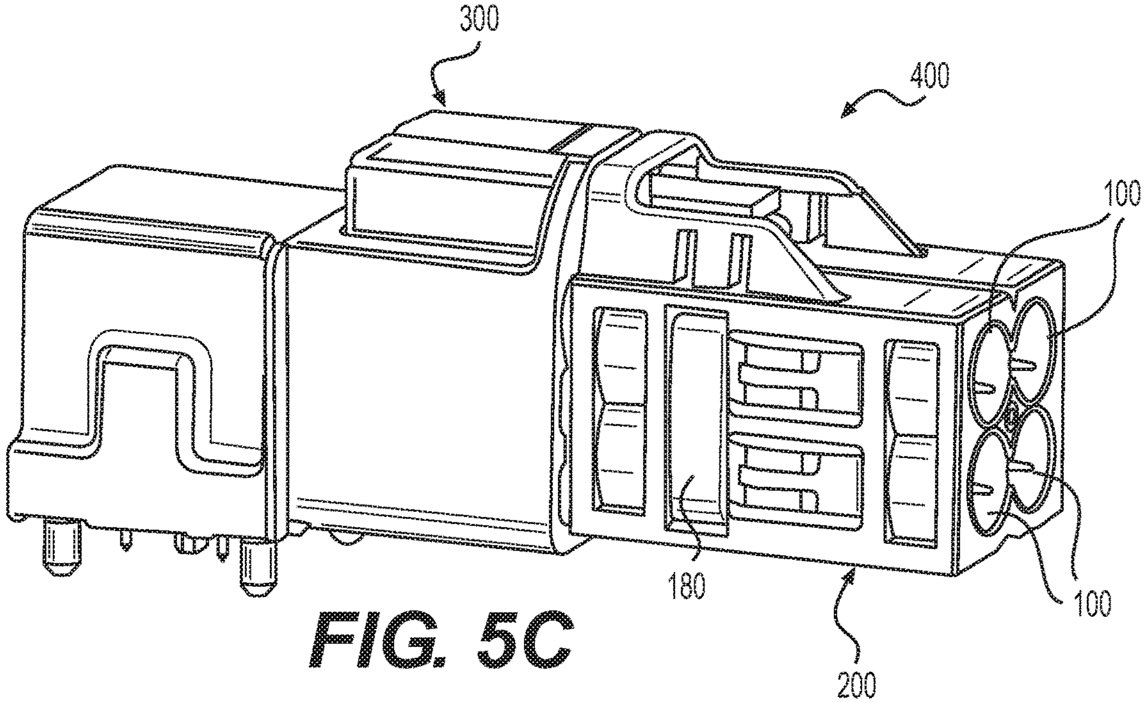

FIGS. 5A-5C illustrate an exemplary connector 200 having one or more of the contact members 100 of the present disclosure, an exemplary mating connector 300, and the assembly 400 of the connectors 200 and 300. Connector 200 may be, for example, a four (4) position cable plug and mating connector 300 may be, for example, a four (4) line printed-circuit-board (PCB) jack.

Figure 6A:
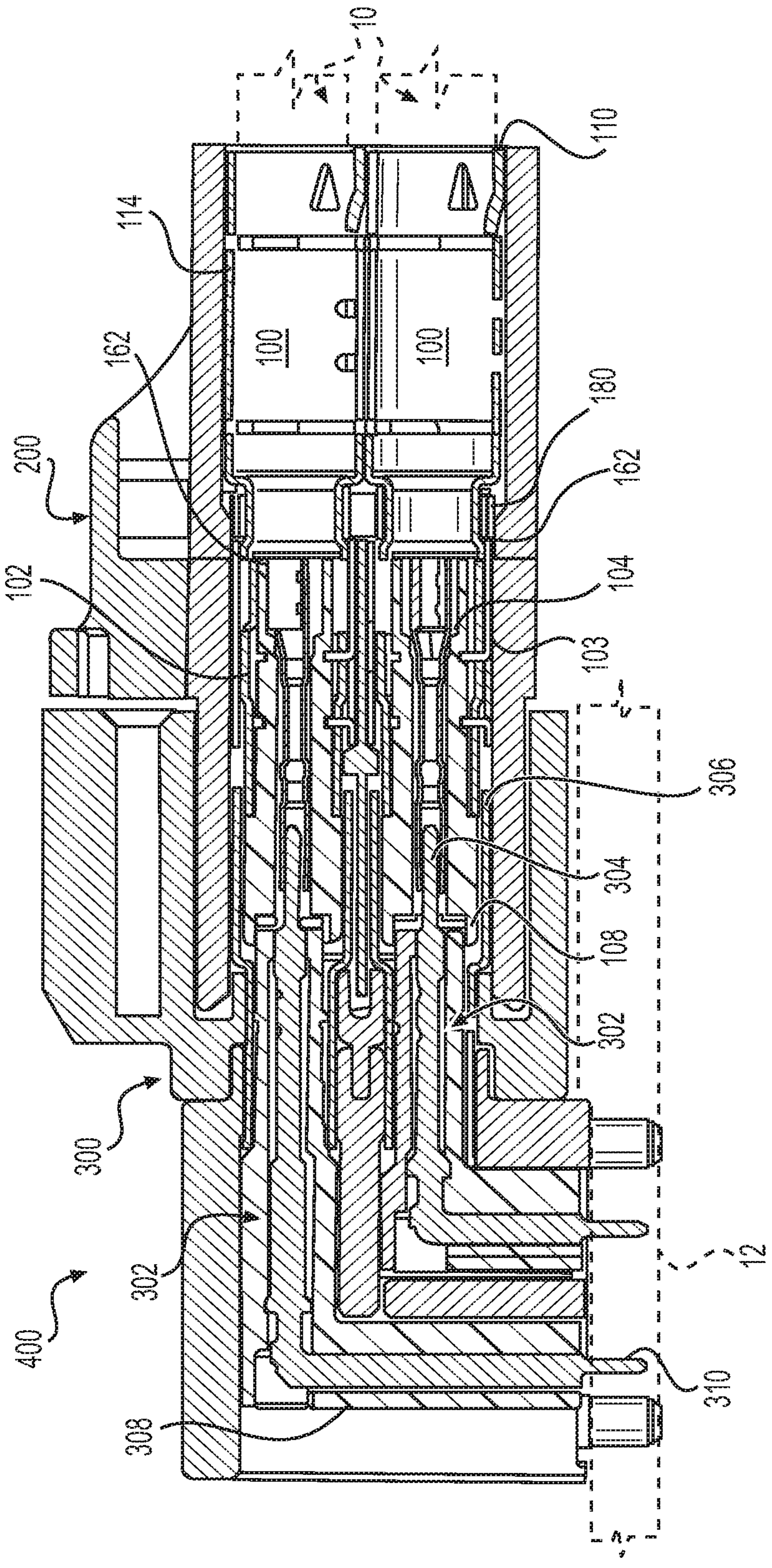
FIG. 6A is a side elevational cross-sectional view of the assembly illustrated in FIG. 5C, showing a right hand configuration.
Figure 6B:
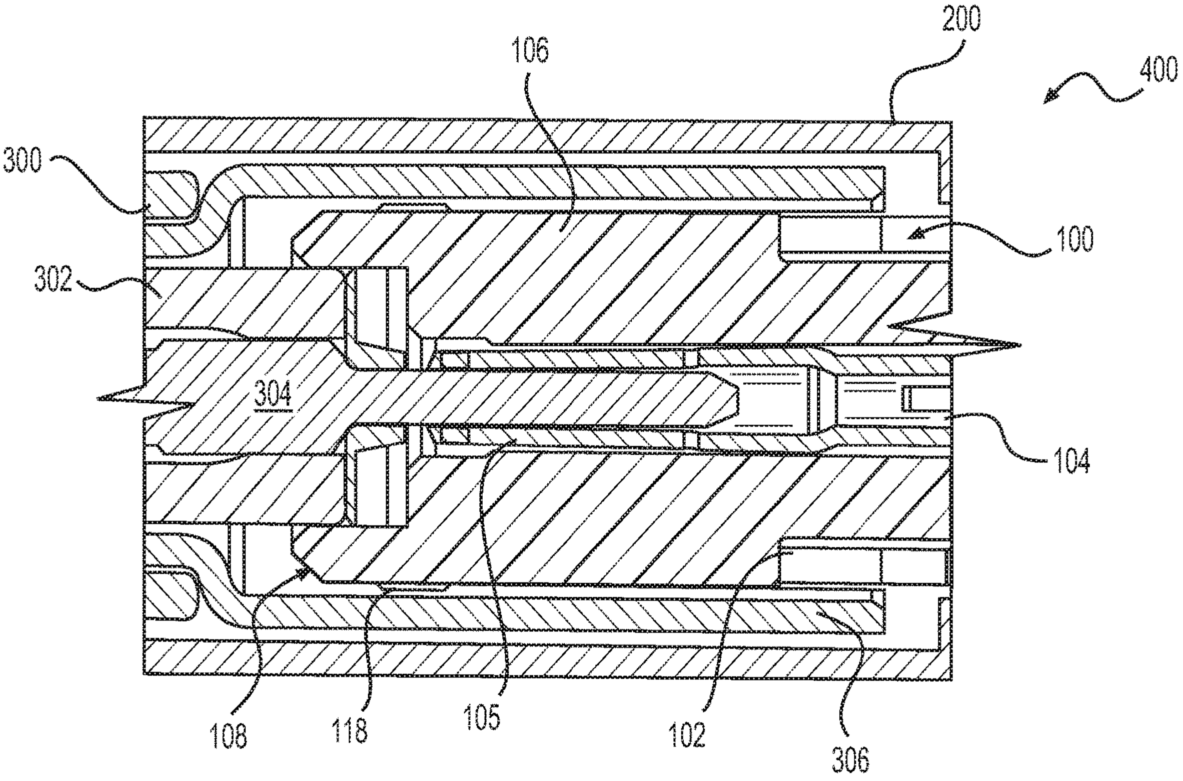
FIG. 6B is an enlarged partial cross-sectional view of the assembly illustrated in FIG. 6A.
Figure 7A:
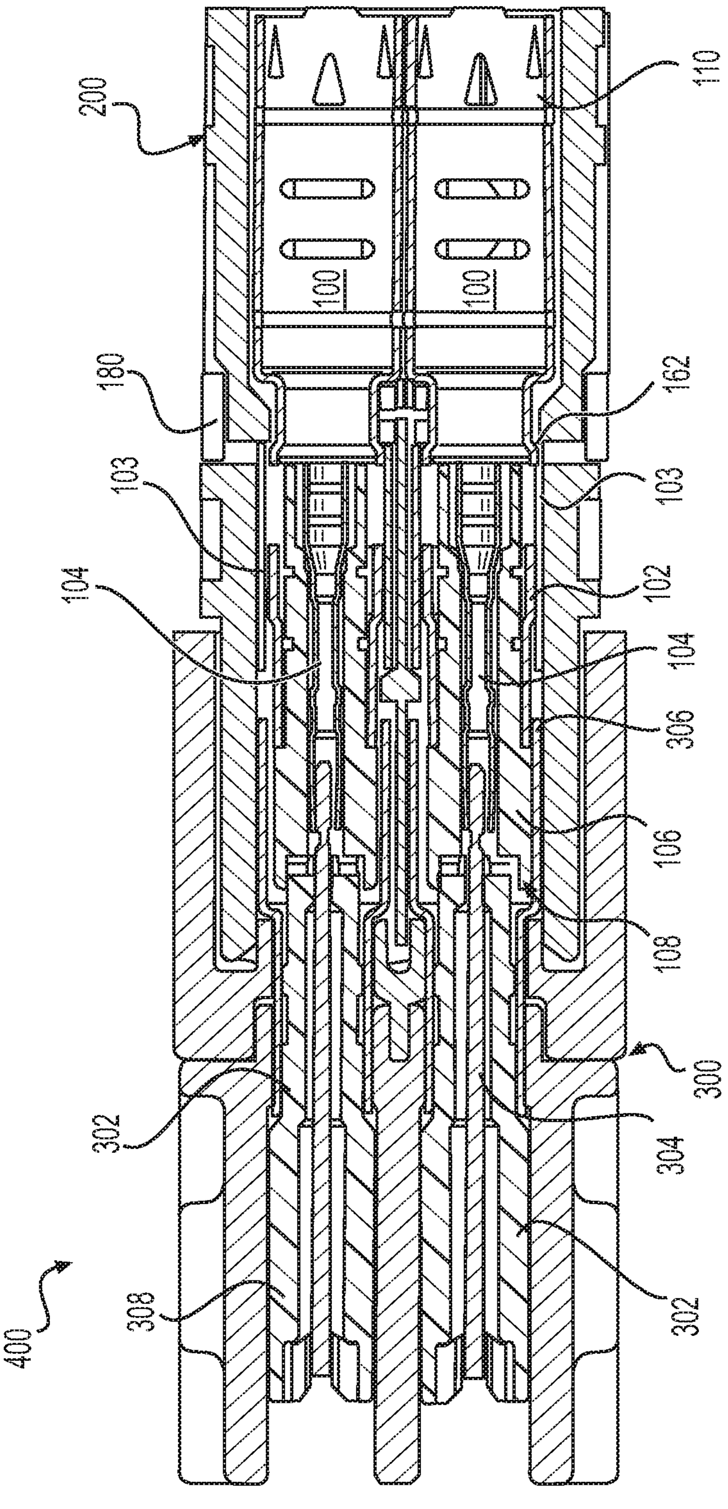
FIG. 7A is a side elevational cross-sectional view of the assembly similar to FIG. 6A, showing a straight configuration.

FIG. 6A shows a cross-section of the assembly 400 of connectors 200 and 300 and FIG. 6B shows an enlarged view of the mating interface between connectors 200 and 300. In the assembly, each contact member 100 may be mated with a corresponding contact member 302 of the mating connector 300 by inserting the front end 108 of each contact member 100 into an interface end 306 of each mating contact member 302. The inner conductor 104 (e.g. socket) of each contact member 100 engages (electrically and mechanically) a corresponding inner conductor 304 (e.g. pin) of mating connector 300 at one end and engages (electrically and mechanically) with cable 10, wires or the like at its other end. The end shoulder 162 of sleeve 103 of each contact member 100 may abut with the inside of the housing of connector 200 and/or with a captivation ring 180 disposed around the contact members 100. The captivation ring 180 may alternatively be disposed around the housing of connector 200, as seen in FIG. 7A. A tail end 308 of each mating contact member 302 may have a right hand configuration, as seen in FIG. 6A or a straight configuration, as seen in FIG. 7A. The inner conductors 304 may have tail ends 310 corresponding to the tail ends 308 of the contact members 302 that are configured to engage (electrically and mechanically) a printed circuit board 12.

Figure 7B:
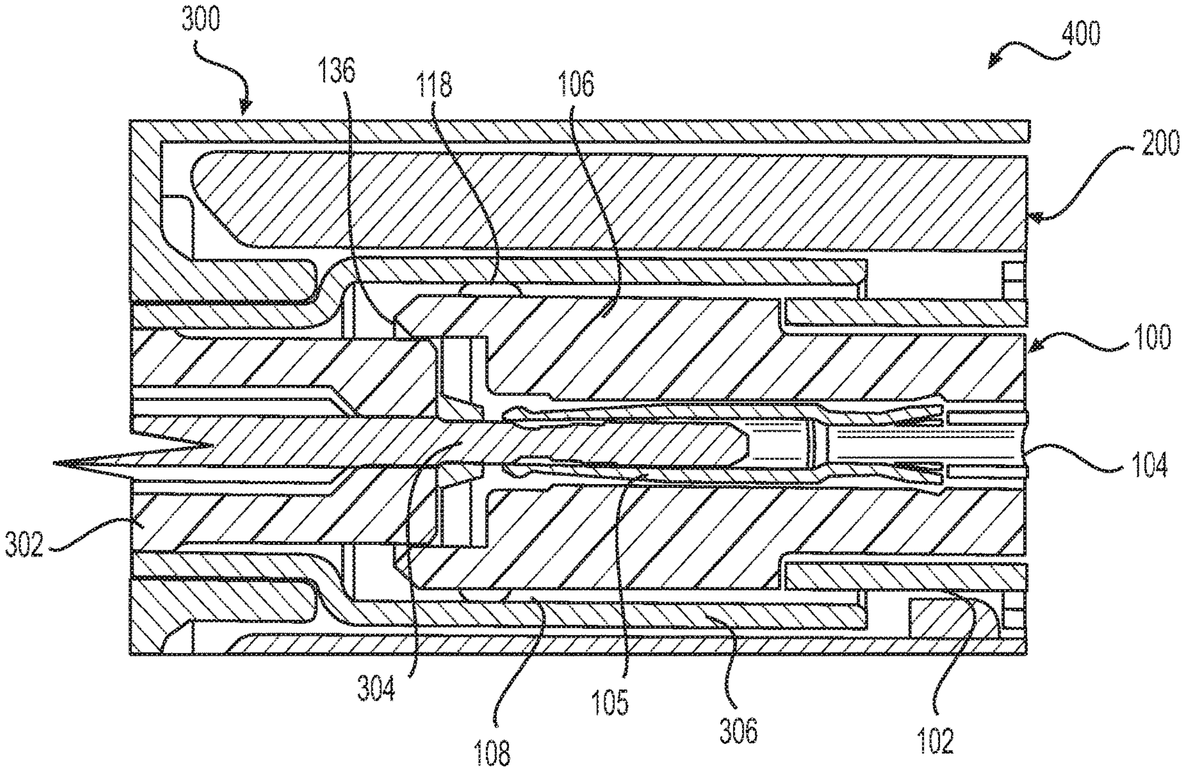
FIG. 7B is an enlarged partial cross-sectional view of the assembly illustrated in FIG. 7A.

As best seen in FIGS. 6B and 7B, when mated, end portion 132 of protective insulator 106 provides a closed entry and barrier to protect the front end 108 of outer conductor 102 and particularly its fingers 118. The mating end 105 of inner conductor 104 (e.g. socket) may be set-back from the front end 108 for closed entry mating with the corresponding inner conductor 304 (e.g. pin) of mating connector 300. And the end face 136 of protective insulator 106 can be configured to prevent the contact member 302 of mating connector 300, and particularly its inner pin 304, from being inserted too far into the mating end 105 of socket 104 of connector 200.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as front, rear, right, elongated. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. A contact member for an electrical connector, comprising:

an outer conductor including a mating interface section, a termination section, and a middle section between the mating interface section and the termination section, wherein the mating interface section includes a front end of the outer conductor, and the termination section includes a rear end of the outer conductor;

an inner conductor received in the mating interface section; and a protective insulator including a main portion and an end portion, wherein the main portion is received in the mating interface section of the outer conductor and supports the inner conductor, and wherein the end portion is configured for closed entry mating, the end portion having an end face extending outside of the front end of the outer conductor, wherein a sleeve is disposed around the middle section of the outer conductor and wherein the middle section includes at least one window that is covered by the sleeve.

2. The contact member of claim 1, wherein the front end of the outer conductor includes a plurality of spring fingers extending over at least part of the end portion of the protective insulator.

3. The contact member of claim 2, wherein the end portion of the protective insulator includes longitudinal spokes each extending between the spring fingers.

4. The contact member of claim 3, wherein the end face of the end portion of the protective insulator is an outer ring from which the spokes extend.

5. The contact member of claim 4, wherein distal ends of the spring fingers rest behind a rear wall of the outer ring for the closed entry mating.

6. The contact member of claim 5, wherein one or more openings are provided behind the rear wall of the outer ring allowing for free movement of the distal ends of the spring fingers.

7. The contact member of claim 1, wherein the outer conductor is formed as one-piece.

8. The contact member of claim 1, wherein the termination section is deformable.

9. The contact member of claim 8, wherein the termination section includes one or more extensions shaped to fit together when the termination section is deformed.

10. An electrical connector, comprising:

one or more contact members, each contact member including, an outer conductor including a mating interface section, a termination section, and a middle section between the mating interface section and the termination section, wherein the mating interface section includes a front end of the outer conductor, and the termination section includes a rear end of the outer conductor;

an inner conductor received in the mating interface section; and a protective insulator including a main portion and an end portion, wherein the main portion is received in the mating interface section of the outer conductor and supports the inner conductor, and wherein the end portion is configured for closed entry mating, the end portion having an end face extending outside of the front end of the outer conductor, wherein a sleeve is disposed around the middle section of the outer conductor and the middle section has an outer diameter that is smaller than an outer diameter of the termination section and wherein the middle section includes at least one window that is covered by the sleeve.

11. The electrical connector of claim 10, wherein the front end of the outer conductor includes a plurality of spring fingers extending over at least part of the end portion of the protective insulator.

12. The electrical connector of claim 11, wherein the end portion of the protective insulator includes longitudinal spokes each extending between the spring fingers.

13. The electrical connector of claim 11, wherein the end face of the end portion of the protective insulator is an outer ring.

14. The electrical connector of claim 13, wherein one or more openings are provided behind a rear wall of the outer ring allowing for free movement of distal ends of the spring fingers.

15. The electrical connector of claim 10, wherein the outer conductor is formed as one-piece.

* * * * *